United States Patent [19]
Anstett et al.

[11] Patent Number: 6,140,263
[45] Date of Patent: *Oct. 31, 2000

[54] PROCESS FOR THE PRODUCTION OF SUPPORTED ZEOLITE MEMBRANES, AND ZEOLITE MEMBRANES SO PRODUCED

[75] Inventors: Martine Anstett, Rueil Malmaison; Ronan Le Dred, Riedisher; Jean-Louis Guth, Mulhouse; Alain Methivier; Christian Streicher, both of Rueil Malmaison, all of France

[73] Assignee: Institute Francais du Petrole, France

[*] Notice: This patent issued on a continued prosecution application filed under 37 CFR 1.53(d), and is subject to the twenty year patent term provisions of 35 U.S.C. 154(a)(2).

[21] Appl. No.: 08/761,340

[22] Filed: Dec. 6, 1996

[30] Foreign Application Priority Data

Dec. 8, 1995 [FR] France ................. 9514563

[51] Int. Cl.$^7$ .................................. B01J 20/28
[52] U.S. Cl. ................ 502/4; 502/60; 502/64; 502/69; 95/902
[58] Field of Search ................ 502/4, 60, 64, 502/69; 210/651, 653, 500.21, 509; 95/902

[56] References Cited

U.S. PATENT DOCUMENTS

| | | | |
|---|---|---|---|
| 4,310,440 | 1/1982 | Wilson et al. | 252/435 |
| 4,699,892 | 10/1987 | Suzuki | 502/4 |
| 4,861,743 | 8/1989 | Flank et al. | 502/214 |
| 4,921,823 | 5/1990 | Furneaux et al. | 502/4 |
| 5,109,263 | 4/1992 | Haag et al. | 210/500.25 |
| 5,183,482 | 2/1993 | Najjar et al. | 55/16 |
| 5,258,339 | 11/1993 | Ma et al. | 502/4 |
| 5,360,474 | 11/1994 | Lauth et al. | 106/402 |
| 5,374,411 | 12/1994 | Davis et al. | 423/306 |
| 5,429,743 | 7/1995 | Geus et al. | 210/490 |
| 5,464,798 | 11/1995 | Jia et al. | 502/64 |
| 5,567,664 | 10/1996 | Barri et al. | 502/4 |

FOREIGN PATENT DOCUMENTS

| | | |
|---|---|---|
| 0 511 739 | 11/1992 | European Pat. Off. . |
| 0 586 745 | 3/1994 | European Pat. Off. . |
| 93/17781 | 9/1993 | WIPO . |
| 93/19840 | 10/1993 | WIPO . |
| 94/25152 | 11/1994 | WIPO . |

OTHER PUBLICATIONS

Geus et al., "Synthesis and Characterization of Zeolite (MFI) ...", J. of the Chem. Soc., 88(20) :3101–3109, 1992. Structure Tree Index.

*Primary Examiner*—Tom Dunn
*Assistant Examiner*—Cam N. Nguyen
*Attorney, Agent, or Firm*—Millen, White, Zelano & Branigan, P.C.

[57] ABSTRACT

A process for the production of a controlled supported zeolite membrane comprises: (a) forming a gel which is principally localised at the surface of a porous support by bringing it into contact, in succession, with two immiscible liquids which contain the agents necessary for formation of said gel, then (b) crystallising the zeolite from said gel and finally (c) eliminating the residual agents. The supported zeolite membranes obtained are advantageously used in continuous gas separation processes.

33 Claims, 2 Drawing Sheets

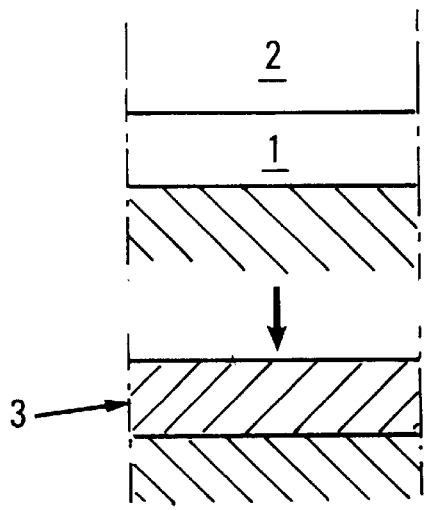
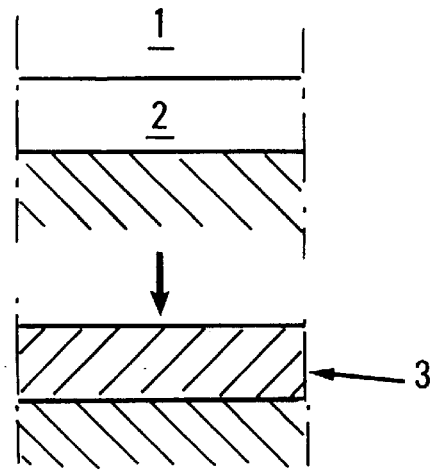
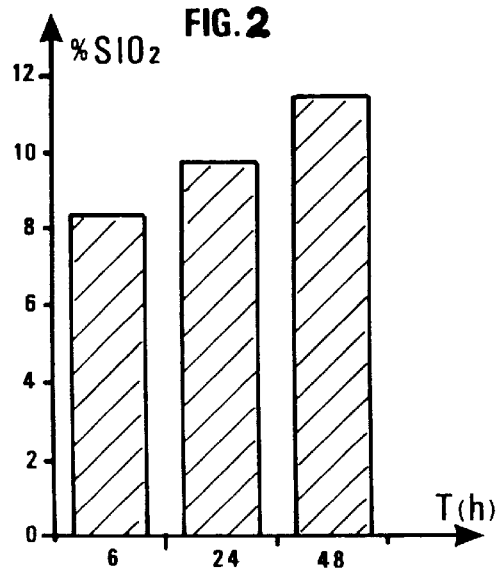
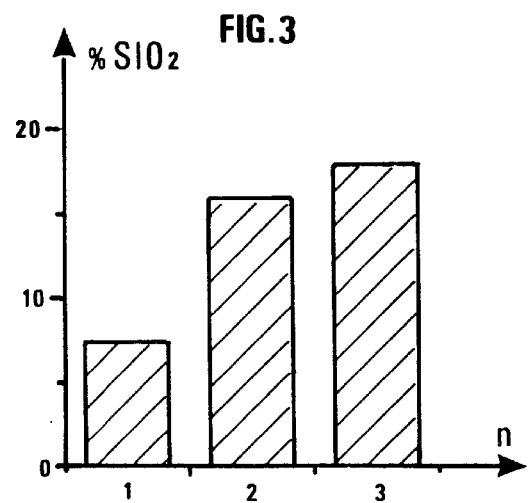
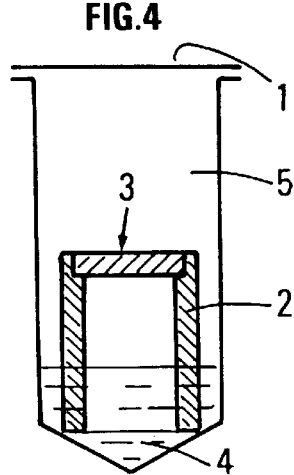

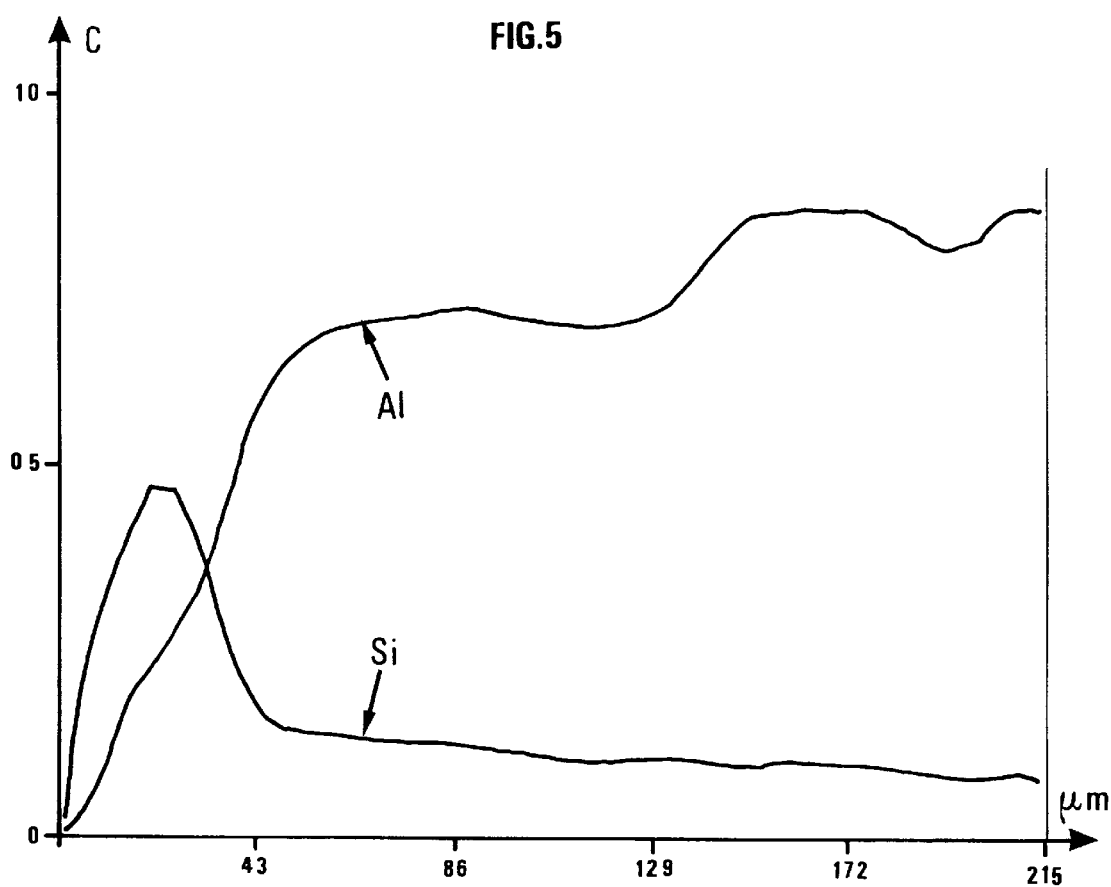

PROCESS FOR THE PRODUCTION OF SUPPORTED ZEOLITE MEMBRANES, AND ZEOLITE MEMBRANES SO PRODUCED

The invention concerns a process for the controlled production of supported zeolite membranes, and membranes so produced.

Zeolites are used for their properties of separation by selective adsorption or for their catalytic properties. However, separation using powdered zeolite is a batch process. A zeolite membrane offers the possibility of using a continuous process of economical interest for separating molecules.

A variety of zeolite membrane production processes have already been described. Such membranes are frequently prepared by crystallising a film of zeolite on and/or in a porous support or on a non porous support. There are two possible cases.

In the first case, the support is immersed in a zeolite precursor gel and the ensemble is subjected to hydrothermal conditions to crystallise the zeolite. Japanese patent application JP-A-60/129119, for example, describes a membrane composed of a film of zeolite crystallised on the surface of an alumina support. In U.S. Pat. No. 5 100 596, a membrane is produced by crystallising a molecular sieve on a non porous surface and separating the film from that surface. In European patent EP-A-0 481 660, which concerns a supported zeolite membrane, the zeolite layer is directly bonded to the support. Before crystallising the zeolite, the support is brought into contact with a solution or suspension containing a source of silicic acid to form silicic acid oligomers on the surface. Japanese patent application JP-A-06/321530 describes a process for the production of composite membranes in which the synthesis temperature is increased during crystallisation.

In the second case, the support is brought into contact with a colloidal solution, separated therefrom and placed in saturated steam to crystallise the zeolite from the adsorbed solution. International patent application WO-A-93/17781 describes a process for forming a zeolite membrane by exposing an aqueous or alcoholic colloidal solution deposited on a porous support to saturated steam.

Processes for producing composite membranes from synthesis gels generally lead to the formation of zeolite crystals at the support exterior. Further, controlling the regularity of the reactant distribution in the gel has proved difficult. Replacement of the gel by a colloidal solution or a solution of reactants allows crystals to form in the pore volume of the support and, as a result, good adhesion of the zeolite to the support, also more regular distribution of the reactants. However, the reactants and, as a result, the zeolite, occupy the whole of the support and are not necessarily localised at the location at which the membrane is formed. A novel process which can form a layer which has good binding with the support, which is homogeneous and which is localised near the surface of the support is thus required.

The present invention concerns a process for the controlled production of supported zeolite membranes. The invention also concerns membranes obtained by this process.

The process comprises (a) forming a gel which is principally localised at the surface of a porous support by bringing it into contact, in succession, with two immiscible liquids which contain the agents necessary for formation of said gel, then (b) crystallising the zeolite from said gel and finally (c) eliminating the residual agents.

This process produces a composite membrane constituted by a continuous thin layer of zeolite which is principally localised at the surface of a porous support both externally and internally thereof. This provides good adhesion of the zeolite to the support. Further, the thickness of the layer and the size and morphology of the crystals are controlled. The thickness is controlled by the quantity of gel incorporated. The size and morphology depend on the relative proportions of the different constituent reactants of the gel. As a result, this process can lead to the formation of thin layers which are suitable for use in separation.

The invention will now be described in more detail with reference to FIGS. 1 to 5, in which:

FIGS. 1A and 1B schematically represent the principle of gel formation, localised principally at the surface of the porous support, using processes A and B, described below;

FIG. 2 shows the percentage of silica formed using process A in an alumina support by hydrolysis of tetramethoxysilane in the presence of water and condensation of the silanol groups formed, as a function of the contact time between the ensemble and water support and the tetramethoxysilane;

FIG. 3 shows the percentage of silica formed using process B in an alumina support by hydrolysis of tetramethoxysilane in the presence of water, methanol and ammonia and condensation of the silanol groups formed as a function of the number of tetramethoxysilane incorporation steps;

FIG. 4 schematically shows the experimental apparatus for hydrothermal crystallisation of zeolite; and FIG. 5 shows a distribution profile for silicon and aluminium through the thickness of a zeolite membrane.

More particularly, in the process of the invention, the support is constituted by a porous material in which the pores have a diameter in the range 4 nm to 100 µm, preferably in the range 4 nm to 10 µm, and in which the fraction of the total pore volume is over 5%, preferably 40%.

The support is constituted by an inorganic, organic or mixed material. A ceramic support based on alumina and/or zirconia and/or titanium oxide is a suitable example. However, other materials may be suitable: metal (stainless steel, silver), glass (sintered glass, Vycor®, glass microfibres), carbon, silica (aerogel), zeolites, clays or polymers. An α-alumina support (in particular an (α-alumina sold by Velterop) is preferably used.

Any geometry is suitable for the support. It may be planar: disk, sheet, etc. It may also be tubular or in the form of a spiral.

The porous support is brought into contact with two immiscible liquids in succession, the liquids containing the agents necessary for formation of the gel: a liquid containing the sources of the hydrolysable framework elements and an aqueous liquid. The liquid containing the sources of the hydrolysable framework elements is constituted by these sources which are pure or diluted in a miscible solvent which is immiscible with the aqueous liquid to avoid homogenisation of the two liquids. The hydrolysable framework element sources are capable of producing $TO_4$ tetrahedra (where T is at least one element selected from Si, Al, B, Ga, Ge and P) and are selected from the group formed by silicon and aluminium alkoxides, and silicon and aluminium chlorides, such as silicon tetrachloride and aluminium trichloride. Preferably, they are silicon or aluminium alkoxides. The aqueous liquid is constituted by pure water, which may have a polar organic solvent added and/or one or more gel formation reaction additives and/or one or more zeolite crystallisation additives. If the polar organic solvent is miscible with the liquid containing the sources of the hydrolysable framework elements, it must be incorporated in small quantities, or the gel formation reaction must be extremely rapid.

The gel formation reaction additives are constituted by inorganic and/or organic acids or bases which act as catalysts. Hydrochloric and hydrofluoric acid, caustic soda and ammonia are suitable examples.

The zeolite crystallisation additives are constituted by acids or bases and/or inorganic salts and/or organic salts and/or undissociated molecules which act as mobilising agents and structuring agents and as a counter-ion for the framework charge. Fluoride or hydroxide ions are the principal mobilising agents, which are introduced, for example, in the form of sodium hydroxide and hydrofluoric acid. A number of inorganic or organic structuring agents are suitable: hydrated cations (sodium or potassium ions), ion pairs (ammonium or phosphonium ions and corresponding anions) or neutral molecules (amines, alcohols or ethers). The most frequently used crystallisation additives are tetrapropylammonium hydroxide or bromide, sodium and potassium hydroxides, ammonia, and hydrofluoric acid, and crown ethers.

The first gel formation step consists of drying the porous support, cooling it to ambient temperature and impregnating it with the aqueous liquid or the liquid containing the sources of hydrolysable framework elements. The support can be dried at a temperature which is in the range 40° C. to 600° C., for example for a period which is in the range 1 minute to 48 hours. It is preferably carried out at 60° C. overnight. Impregnation preferably consists of immersing the support in the liquid. Other methods are possible, however, for example depositing a liquid on the porous support surface. Impregnation can be carried out at a temperature which is in the range −20° C. to 200° C., for a period which is in the range 1 minute to 72 hours and at a pressure which is in the range $10^{-5}$ to 1 atmosphere. As an example, impregnation can be carried out at ambient temperature for 30 minutes at a pressure of $2 \times 10^{-2}$ atm.

The second gel formation step consists of bringing the support which has been impregnated with the first liquid into contact with a second liquid which is immiscible with the first. The gel can be formed by processes A and B described with reference to FIGS. 1A and 1B, in which (1) represents the aqueous liquid, (2) represents the liquid containing the hydrolysable framework element sources and (3) represents the gel.

In process A, the porous support impregnated with aqueous liquid is brought into contact with a liquid containing sources of the hydrolysable framework elements, preferably tetramethoxysilane. There are two possibilities. In the first case, the aqueous liquid is constituted by pure water. The gel formation reaction is slow. The quantity of gel formed depends on the period of contact between the support-water ensemble and the liquid containing the hydrolysable framework element sources. In FIG. 2, the contact period in hours is along the abscissa and the percentage of silica formed with respect to the initial weight of the support is up the ordinate. For tetramethoxysilane, this period can be in the range 1 hour to 15 days, and the weight of silica gel incorporated with respect to the initial weight of the support is preferably in the range 4% to 15%. In the second case, the aqueous liquid is constituted by water with an added polar organic solvent and/or a number of additives. In the presence of these, the gel formation reaction is preferably rapid to avoid diffusion of the reactants from the aqueous liquid out of the porous support. It can be rapid and complete in the presence of a catalyst. Mobilising agents such as fluoride or hydroxide ions are preferably used in this respect. The rate of gel formation depends on the composition of the aqueous liquid. As an example, the more basic the solution, the higher the rate.

In process B, the porous support impregnated with the liquid containing the hydrolysable framework element sources, preferably tetramethoxysilane, is brought into contact with the aqueous liquid. There are two possibilities. In the first case, the aqueous liquid is constituted by pure water. The gel formation reaction is slow. The quantity of gel formed depends on the period of contact between the ensemble constituted by support and the liquid containing the hydrolysable framework element sources, and the water. The quantity of gel formed is nevertheless limited by the quantity of liquid containing the hydrolysable framework element sources initially introduced into the porous support. In the second case, the aqueous liquid is constituted by water with an added polar organic solvent and/or a number of additives. In the presence of these, the gel formation reaction is preferably rapid to avoid diffusion of the liquid containing the hydrolysable framework element sources out of the porous support. It can be rapid and complete in the presence of a catalyst. Mobilising agents such as fluoride or hydroxide ions are preferably used in this respect. The quantity of gel formed and, as a consequence, the thickness of the zeolite layer, is controlled by the quantity of liquid containing the hydrolysable framework element sources which is incorporated.

In processes A and B, the quantity of gel formed can be increased by repeating the two gel formation steps as many times as is necessary. FIG. 3 shows the number of incorporation steps along the abscissa and the percentage of silica formed with respect to the initial weight of the support up the ordinate.

After formation of the gel, supplemental reactants can be incorporated. The support containing the previously formed gel is washed if necessary, for example with methanol, and dried at a temperature which is in the range 40° C. to 200° C. for a period which is in the range 1 hour to 24 hours. Drying is preferably carried out at a temperature which is in the range 60° C. to 100° C., for example for a period which is in the range 2 hours to 24 hours. The support containing the gel is then brought into contact with a solution which may contain zeolite crystallisation additives and/or an additional zeolite framework element, preferably in the form of silicon and/or aluminium alkoxides and/or oxides to prevent the formation of any cracks. In the case of a silica gel formed by process A or B, the weight of silica incorporated with respect to the weight of silica already incorporated can be up to 50%. This percentage is preferably in the range 10% to 20%.

The zeolite is then crystallised by bringing the gel into contact with saturated steam. Thus the support containing the gel is placed in a suitable apparatus (FIG. 4) and exposed to saturated steam at a temperature which is in the range 50° C. to 300° C., preferably in the range 80° C. to 220° C., for example, for a period which is in the range 1 hour to 15 days, preferably in the range 3 hours to 72 hours, to crystallise the gel to the zeolite. By way of illustration, the apparatus shown in FIG. 4 consists of an autoclave with a PTFE (polytetrafluoroethylene) lining (1), in which a cylindrical element (2) is installed, which is also of PTFE, which supports the porous support on which gel (3) is formed. The autoclave contains liquid water (4) in equilibrium with steam (5) at the pressure under consideration.

Supplemental volatile zeolite crystallisation additives can be added to the steam, for example hydrofluoric acid, ammonia or amines such as propylamine or triethylamine, or alcohols such as methanol.

The membrane formed is cooled to ambient temperature and washed to eliminate at least part of the gel formation reaction additives and/or those for zeolite crystallisation. Washing is preferably carried out using distilled water. The membrane is then dried, preferably at 60° C., for a period which is in the range 2 hours to 24 hours, then cooled to ambient temperature.

The following operations can be repeated as many times as is necessary: gel formation followed by zeolite crystallisation, cooling, washing and drying the membrane formed; supplemental addition of zeolite crystallisation additives and/or zeolite framework elements followed by zeolite crystallisation, cooling, washing and drying the membrane formed.

The membrane is then calcined by heating slowly to a temperature which is in the range 300° C. to 800° C., preferably in the range 400° C. to 600° C. Heating can be carried out continuously or in stages, for example over a period which is in the range 5 hours to 50 hours. The calcining temperature is then held at this value for a period which is, for example, in the range 10 minutes to 24 hours. The membrane is then cooled slowly to ambient temperature. Cooling can be carried out continuously or in stages, for example over a period which is in the range 1 hour to 24 hours.

The process can be applied to all zeolites, i.e., all crystalline solids which are characterized by a structure comprising a three-dimensional framework resulting from interlinking of $TO_4$ tetrahedra (T being selected from Si, Al, B, Ga, Ge and P, for example), each oxygen atom being common to two tetrahedra, and channels and cavities of molecular dimensions. Suitable examples of structural types are FAU, GME, MOR, OFF, MFI, MEL, FER, LTA and CHA, using the IUPAC nomenclature.

The thickness of the continuous zeolite layer can be controlled by the quantity of gel incorporated. It is in the range 1 μm to 100 μm, preferably in the range 5 μm to 50 μm. The size and morphology of the crystals depends on the relative proportions of the different constituent reactants of the gel. Crystals formed in a highly basic medium are generally small, of the order of several micrometres. The more basic the medium, the smaller the crystals.

The process of the invention can also be applied to the production of membranes comprising any oxide on a support, which oxide can be designated by the term "silicometallate", in which the structure includes $SiO_4$ tetrahedra and $TO_6$ octahedra, where T represents at least one element selected, for example, from titanium, manganese, molybdenum and tungsten, for example titanosilicates. The liquid which is not miscible with the aqueous liquid must then contain hydrolysable framework element sources of the desired oxide.

The process of the invention can also be applied to the production of membranes constituted by mesoporous solids (pore dimensions of about 1.5 to 10 nanometres) on a porous support. The porous support is brought into contact, in succession, with two immiscible liquids containing the agents necessary for the formation of the mesoporous solid.

One of the two immiscible liquids consists of an aqueous liquid which may contain at least one additive for the gel formation reaction, which may be an acid or a base, and containing at least one mesoporous solid formation additive, which may consist of a cationic surfactant, in particular a quaternary ammonium halide, for example hexadecyltrimethylammonium chloride or bromide, and possibly an additional acid or base.

The gel formation reaction additives are the same as those for producing a zeolite membrane, i.e., acids or bases, for example HCl, HF, NaOH or $NH_3$.

The liquid which is not miscible with the aqueous liquid contains hydrolysable sources which produce the mesoporous solid, selected from silicon or aluminium alkoxides, silicon or aluminium chlorides, such as silicon tetrachloride or aluminium trichloride (silicon or aluminium alkoxides are preferred) and similar compounds of other metals which may form part of the mesoporous solid composition which it is desired to deposit on the support.

Depending on the conditions under which the support is brought into contact with the two immiscible liquids, the mesoporous solid can be formed directly. If the mesoporous solid is not obtained after contact of the two liquids, hydrothermal treatment can be carried out, for example by contact with saturated steam at a temperature of between 50° C. and 300° C., preferably 80° C. to 220° C., for a period of 1 hour to 15 days, preferably 3 hours to 72 hours, to form the mesoporous solid on the support. The ensemble is then cooled, for example to ambient temperature.

In all cases, the membrane formed is then washed, dried and calcined under the conditions described above for zeolite membranes.

Examples of mesoporous solids which can be deposited on porous supports to form the membranes using the process of the invention are those of the M41S family, more specifically those of type MCM-41.

Finally, membranes constituted by microporous non zeolitic oxides on a porous support can be produced by the process of the invention including forming the gel by bringing a porous support into contact with two immiscible liquids containing the agents necessary to form said gel: an aqueous liquid and a non miscible liquid containing hydrolysable sources leading to the desired microporous oxide. In this case, the aqueous liquid contains no crystallisation additives, but only the gel formation reaction additive or additives and the oxide formation reaction additive or additives.

The support including the formed gel is dried at a temperature which is in the range 20° C. to 200° C., for example for a period which is in the range 5 minutes to 24 hours; then calcined at a temperature of 300° C. to 600° C., preferably about 400° C., for example for a period of 5 minutes to 24 hours. The calcined membrane is then cooled to ambient temperature.

Microporous oxides can, for example, consist of silicas, aluminas, aluminosilicates or simple or combined oxides of various other metals.

The membranes obtained by the process of the invention can advantageously be used in gas or liquid separation pervaporation processes. Particular examples of separation processes are:

separation of n- and iso-isomers of $C_4$, $C_6$, $C_7$ or $C_8$ hydrocarbons;

separation of $C_6$ and $C_7$ paraffinic isomers as a function of their degree of branching (single, double or triple branched isomers);

separation of para-xylene from a cut containing at least one other xylene;

separation of methane and nitrogen; or separation of methane and carbon dioxide.

The following examples are intended to illustrate the invention without limiting its scope.

EXAMPLE 1 (Preparation using process A)

An α-alumina support (from Velterop) with a pore diameter of 0.15 μm was dried at 60° C. overnight, cooled to ambient temperature in a desiccator packed with silica gel, and weighed. It weighed 1.9563 g. It was immersed in 17 g of an aqueous solution containing 4% of NaOH and 3.1% of tetrapropylammonium hydroxide TPAOH (% by weight) for 2 hours. The support containing 0.37 g of solution was then immersed in 10 g of $Si(OCH_3)_4$ for 3 hours. After separation, the weight of the support had increased by 0.09 g. The support and the zeolite precursor gel formed were placed in saturated steam at 170° C. for 48 hours. The autoclave was cooled to ambient temperature. The support was washed with distilled water, dried at 60° C. overnight, cooled to ambient temperature in a desiccator packed with silica gel, and weighed. It weighed 2.1037 g. The support was again immersed in the above solution for 2 hours. The weight of incorporated solution was 0.30 g. The support was immersed in 10 g of $Si(OCH_3)_4$ for 3 hours. After separation, the weight of the support had increased by 0.02 g. A second zeolite crystallisation step was carried out in saturated steam at 170° C. for 48 hours. The autoclave was cooled to ambient temperature. The membrane was washed with distilled water, dried at 60° C. overnight, cooled to ambient temperature in a desiccator packed with silica gel, calcined at 500° C. for 6 hours (heating rate: 0.5° C./min; cooling rate: 1° C./min) then cooled to ambient temperature.

Before the calcining step (channels of the zeolite obstructed by tetrapropylammonium ions $TPA^+$), the membrane was methane-tight. This shows the absence of spaces between the zeolite crystals. The average size of the zeolite crystals in the membrane formed was 5 $\mu$m.

EXAMPLE 2 (Preparation using process A)

The operating procedure was similar to that for the membrane described in Example 1, with the exception that the composition of the aqueous solution used for the $Si(OCH_3)_4$ hydrolysis reactions and condensation of the species formed. The aqueous solution was composed of 4% of NaOH and 6.2% of TPAOH. The average zeolite crystal size was of the order of 2 $\mu$m, while that of the membrane described in Example 1 was of the order of 5 $\mu$m. This shows that the crystal size can be controlled by the solution composition.

EXAMPLE 3 (Preparation using process B)

An α-alumina support (from Velterop) with a pore diameter of 0.15 $\mu$m was dried at 60° C. overnight, cooled to ambient temperature in a desiccator packed with silica gel, and weighed. It weighed 1.9487 g. It was disposed in unstable equilibrium in a crystallizer containing tetramethoxysilane. The ensemble was placed in a chamber under reduced pressure for 10 minutes to eliminate air occluded in the support. It was then agitated in tetramethoxysilane, still under reduced pressure. The immersion time was 30 minutes. The support containing 0.33 g of tetramethoxysilane was immersed for 30 minutes in 7.2 g of a solution constituted by a mixture of water, ammonia and methanol. The molar composition of the solution, for one mole of $Si(OCH_3)_4$, was as follows: 16.7 $NH_3$; 46.7 $CH_3OH$; 50 $H_2O$. The support containing the silica gel was washed with methanol, dried at 60° C. overnight, then at 100° C. for 2 hours, cooled to ambient temperature in a desiccator packed with silica gel, and weighed. The weight of silica formed in the support was 0.15 g. the support containing the silica gel was immersed for 1 hour in 15 g of an aqueous solution of sodium silicate and tetrapropylammonium bromide with molar composition: $SiO_2$; 0.6 NaOH; 0.1 TPABr; 20 $H_2O$. The weight of this incorporated solution was 0.23 g. The support containing the zeolite precursor gel was placed in saturated steam at 170° C. for 48 hours. The autoclave was cooled to ambient temperature. The support was washed in distilled water, dried at 60° C. for 2 hours, cooled to ambient temperature in a desiccator packed with silica gel and immersed again in the above solution for 2 hours. The weight of incorporated solution was 0.36 g. A second zeolite crystallisation step was carried out in saturated steam at 170° C. for 48 hours. The autoclave was cooled to ambient temperature. The membrane was washed with distilled water, dried at 60° C. overnight, cooled to ambient temperature in a desiccator packed with silica gel, calcined at 500° C. for 6 hours (heating rate: 0.5° C./min; cooling rate: 1° C./min) then cooled to ambient temperature.

Before the calcining stage (zeolite channels obstructed by $TPA^+$), the membrane was methane-tight. This showed the absence of spaces between the zeolite crystals.

EXAMPLE 4

Gas permeation measurements were carried out on the membrane prepared as described in Example 3.

The membrane was adhered to a perforated metal disk using a gas-tight epoxy resin. The ensemble was placed in a gas permeation apparatus and the membrane was subjected to a pressure difference. The pressure of the upstream side was held constant at 2 bars absolute and the downstream side was at atmospheric pressure. The gas flow rate was measured using a flow meter.

The flow rates were measured after calcining the membrane at 500° C. for 6 hours and activation of the zeolite at 373 K (Table 1).

TABLE 1

GAS FLOW RATES

| Gas | Pressure difference (bar) | Flow rate ($cm^3/h$) ambient temperature | Flow rate ($cm^3/h$) 373K |
|---|---|---|---|
| $H_2$ | 1 | 281 | — |
| $CH_4$ | 1 | 126.7 | 128.6 |
| i-$C_4H_{10}$ | 1 | 5 | 5 |

The selectivity of methane over isobutane was only 1.5 for the support with no zeolite. It was 25.3 at ambient temperature and 25.7 at 373 K for the membrane.

EXAMPLE 5

A distribution profile for elements Si and Al was carried out on the membrane of Example 3 over a thickness of the order of 200 $\mu$m. It showed that the silicon atoms, and as a consequence the zeolite, were principally localised at the support surface (FIG. 5). In FIG. 5, the diameter in micrometres is shown along the abscissa and the concentration by weight of silicon and aluminium is shown up the ordinate.

EXAMPLE 6 (Preparation using process B)

An α-alumina support (from Velterop) with a pore diameter of 0.15 $\mu$m was dried at 60° C. overnight, cooled to ambient temperature in a desiccator packed with silica gel, and weighed. It weighed 1.9596 g. It was disposed in unstable equilibrium in a crystallizer containing tetramethoxysilane. The ensemble was placed in a chamber under reduced pressure for 10 minutes to eliminate air occluded in the support. It was then agitated in tetramethoxysilane, still under reduced pressure. The immersion time was 30 minutes. The support containing 0.33 g of tetramethoxysilane was immersed for 30 minutes in 7.2 g of a solution constituted by a mixture of water, ammonia and methanol. The molar composition of the solution, for one mole of $Si(OCH_3)_4$, was as follows: 16.7$NH_3$; 46.7 $CH_3OH$; 50 $H_2O$. The support containing silica gel was washed with methanol, dried at 60° C. overnight, then at 100° C. for 2 hours, cooled to ambient temperature in a desiccator packed with silica gel, and weighed. The weight of silica formed in the support was 0.15 g. The support containing the silica gel was immersed in 10 g of an aqueous solution containing 3.3% of NaOH and 22.3% of TPABr (% by weight) under reduced pressure for 10 minutes. The weight of this incorporated solution was 0.30 g. The final hydrogel included in the support had the following molar composition: $SiO_2$; 0.1 NaOH; 0.1 TPABr; 5 $H_2O$. The support containing the zeolite precursor gel was placed in saturated steam at 170° C. for 48 hours. The autoclave was cooled to ambient temperature. The membrane was washed in distilled water, dried at 60° C. overnight, cooled to ambient temperature in a desiccator packed with silica gel, calcined at 550° C. for 6 hours (heating rate: 0.5° C./min; cooling rate: 1° C./min) then cooled to ambient temperature.

Before the calcining stage (zeolite channels obstructed by $TPA^+$), the membrane was methane-tight. This showed the absence of spaces between the zeolite crystals.

What is claimed is:

1. A process for preparing a composite membrane comprising a continuous layer of controlled thickness of an oxide selected from a zeolite, a silico-metallate, a mesoporous oxide and a microporous oxide, principally localized at the surface of a porous support, said process comprising:

forming a gel localized principally at said surface of said porous support, by bringing said support into contact, in any order, a first liquid comprising hydrolyzable framework elements for gel formation and a second liquid, wherein the second liquid is an aqueous liquid, and wherein the first liquid and the second liquid are immiscible; and transforming said gel into the oxide.

2. A process according to claim 1, wherein the support is constituted by a porous material in which the pores have a diameter in the range of 4 nm to 100 µm, and in which the fraction of the total pore volume is over 5%.

3. A process according to claim 2, wherein the support is constituted by an inorganic, organic or mixed material, selected from ceramic materials based on alumina, zirconia or titanium oxide, metals, glasses, carbon silica, zeolites, clays and polymers.

4. A process according to claim 1, wherein the support is constituted by an inorganic, organic or mixed material, selected from ceramic materials based on alumina, zirconia or titanium oxide, metals, glasses, carbon silica, zeolites, clays and polymers.

5. A process according to claim 1, wherein said hydrolyzable framework elements are selected from silicon alkoxides, aluminum alkoxides, silicon chlorides and aluminum chlorides.

6. A process according to claim 1, wherein the first liquid further comprises sources of the hydrolyzable framework elements which are pure or which are diluted in a solvent which is not miscible with the second liquid.

7. A process according to claim 1, wherein the second liquid comprises pure water or water to which is added at least one substance selected from the group consisting of at least one polar organic solvent, at least one gel formation reaction additive and at least one oxide synthesis additive.

8. A process according to claim 7, wherein said gel formation reaction additive is selected from acids and bases.

9. A process according to claim 7, wherein said oxide formation additive is selected from acids and bases.

10. A process according to claim 1, wherein said porous support is impregnated with the second liquid followed by bringing the surface of said impregnated support into contact the first liquid.

11. A process according to claim 10, wherein the operations described therein are repeated at least once.

12. A process according to claim 1, wherein said porous support is impregnated with the first liquid followed by bringing the surface of said impregnated support into contact with the second liquid.

13. A process according to claim 12, wherein the operations described therein are repeated at least once.

14. A process according to claim 1, wherein the oxide is a zeolite.

15. A process according to claim 14, wherein the second liquid further comprises a gel formation reaction additive selected from the group consisting of hydrochloric acid, hydrofluoric acid, caustic soda and ammonia.

16. A process according to claim 14, wherein the step for transforming the gel into the desired oxide comprises contacting the gel with a zeolite crystallization additive selected from the group consisting of tetrapropylammonium hydroxide or bromide, sodium or potassium hydroxide, ammonia, hydrofluoric acid and crown ethers.

17. A process according to claim 16, further comprising optionally washing and drying the gel, followed by contacting the gel for a second time with a solution containing at least one zeolite crystallization additive and/or additional hydrolyzable zeolite framework elements.

18. A process according to claim 14, wherein the zeolite is crystallized by bringing the formed gel into contact with saturated steam at temperatures in the range of from 50° C. to 300° C.

19. A process according to claim 18, wherein said steam phase contains volatile acids, bases, amines or alcohols.

20. A process according to claim 14, wherein the resultant membrane formed is cooled and washed and the washed membrane is dried.

21. A process according to claim 14, wherein the operations described therein are repeated at least once on said formed membrane.

22. A process according to claim 14, wherein the resultant membrane is calcined by slow heating to a calcining temperature in the range of from 300° C. to 800° C., said membrane being held at said calcining temperature, said calcined membrane then being slowly cooled to ambient temperature.

23. A process according to claim 1, wherein the oxide comprises a silico-metallate including $SiO_4$ tetrahedra and $TO_6$ octahedra, where T is selected from Ti, Mn, Mo and W.

24. A process according to claim 1, wherein the oxide is a mesoporous oxide.

25. A process according to claim 24, wherein the second liquid further comprises a mesoporous oxide synthesis additive which includes a cationic surfactant.

26. A process according to claim 24, wherein mesoporous oxide is synthesized directly after bringing the the first liquid and the second liquid into contact.

27. A process according to claim 24, wherein mesoporous oxide is synthesized after bringing the first liquid and the second liquid into contact, then bringing the formed gel into contact with saturated steam at a temperature which is in the range of from 50° C. to 300° C.

28. A process according to claim 24, in which the membrane obtained is calcined by slowly heating to a calcining temperature which is in the range of from 300° C. to 800° C., said membrane being held at said calcining temperature, said calcined membrane then being gradually cooled to ambient temperature.

29. A process according to claim 1, wherein said oxide is a non zeolitic microporous oxide, and wherein the second liquid further comprises a gel formation reaction additive or additives, and wherein the first liquid comprises hydrolysable sources leading to the microporous oxide.

30. A process according to claim 29, wherein the support comprising the formed gel is dried at a temperature which is in the range of from 20° C. to 200° C., then calcined at a temperature of from 300° C. to 600° C., calcined membrane then being cooled to ambient temperature.

31. A process according to claim 1, wherein the aqueous liquid comprises water, ammonia and methanol.

32. A process according to claim 31, wherein the first liquid comprises tetramethoxysilane.

33. A process according to claim 1, wherein the first liquid comprises tetramethoxysilane.

* * * * *